United States Patent [19]

Hanson et al.

[11] Patent Number: 4,755,585

[45] Date of Patent: Jul. 5, 1988

[54] INJECTION MOLDABLE POLYAMIDE IMIDE FROM TRIMELLITIC ANHYDRIDE END CAPPED WITH ANILINE

[75] Inventors: Robert B. Hanson, Oswego; Jeffrey D. Felberg, Oak Park; Gary T. Brooks, Naperville, all of Ill.

[73] Assignee: Amoco Corporation, Chicago, Ill.

[21] Appl. No.: 889,210

[22] Filed: Jul. 25, 1986

Related U.S. Application Data

[60] Continuation-in-part of Ser. No. 653,546, Sep. 24, 1984, abandoned, which is a division of Ser. No. 609,472, May 11, 1984, abandoned, which is a continuation-in-part of Ser. No. 406,110, Aug. 6, 1982, Pat. No. 4,448,925.

[51] Int. Cl.$^4$ .............................................. C08G 73/14

[52] U.S. Cl. ............................ 528/182; 524/600; 525/432; 525/436; 528/172; 528/173; 528/179; 528/185; 528/188; 528/189; 528/350; 528/351; 528/352; 528/353

[58] Field of Search ............... 528/188, 189, 350, 352, 528/353; 525/432, 436; 524/600

[56] References Cited

U.S. PATENT DOCUMENTS 4,136,085  1/1979  Hanson .............................. 528/189
4,258,155  3/1981  Holub et al. ....................... 525/431

Primary Examiner—Harold D. Anderson
Attorney, Agent, or Firm—Robert G. Ladd; William H. Magidson; Ralph C. Medhurst

[57] ABSTRACT

Novel polymers and molding compositions are prepared from acyl halide derivatives of tricarboxylic acids and diamines and about 1 to about 10 percent by weight of phthalic anhydride, trimellitic anhydride or aniline moieties. The polymers are useful in engineering plastics.

18 Claims, No Drawings

INJECTION MOLDABLE POLYAMIDE IMIDE FROM TRIMELLITIC ANHYDRIDE END CAPPED WITH ANILINE

This application is a continuation-in-part of U.S. Ser. No. 653,546 filed Sept. 24, 1984, which was a division of U.S. Ser. No. 609,472 filed May 11, 1984, both abandoned which was a continuation-in-part of U.S. Ser. No. 406,110, filed Aug. 6, 1982, now U.S. Pat. No. 4,448,925, the specification and claims of which are incorporated herein by reference.

FIELD OF THE INVENTION

The field of this invention relates to polyamideimide polymers containing about 1 to about 10 percent phthalic anhydride, aniline or trimellitic anhydride or a mixture of these prepared in an organic solvent, and to molding powders and molded articles prepared therefrom.

BACKGROUND

Amide-imide polymers are a relatively new class of organic compounds known for their solubility in nitrogen-containing organic solvents when in the largely polyamide form. The major application of the amide-imide polymers has been as wire enamels. This is illustrated in U.S. Pat. Nos. 3,661,832 (1972); 3,494,890 (1970); and 3,347,828 (1967).

Compositions prepared from isophthalic acid and diamines and aliphatic diamines have found application in coatings and films. The prior art on this is summarized in U.S. Pat. No. 3,444,183 (1969).

Reinforced polyhexamethylene isophthalamides have been used to produce articles as disclosed in U.S. Pat. No. 4,118,364 (1978). However, the physical properties of these reinforced polyhexamethylene isophthalamides are insufficient for use in engineering plastics since their tensile strength and continuous service temperature do not meet those required for engineering plastics.

U.S. Pat. Nos. 3,817,921 (1974) and 3,897,497 (1975) disclose polyamide-imides which are both tractable and soluble in polar solvents as well as stable at high temperatures prepared by the condensation polymerization of aromatic diamines or oligomers containing oxygen, sulfone, and optionally alkylidene linkages with trimellitic acid, trimellitic acid anhydride, or trimellitic anhydride acid chloride.

U.S. Pat. No. 4,313,868 (1982) discloses copolymers and molding compositions prepared from acylhalide derivatives of dicarboxylic acids, acylhalides of tricarboxylic aromatic anhydrides and aromatic diamines. That reference also discloses glass-filled copolymers. These products, useful as engineering plastics, have a tendency to have flow problems. These problems are overcome when about 1 to about 10 percent phthalic anhydride, aniline or trimellitic anhydride or a mixture of these is added to the polymer.

U.S. Pat. No. 4,136,085 (1979) discloses that the addition of phthalic anhydride to compositions based on the acylhalide derivative of trimellitic anhydride and diamines did not improve the flow properties of the polymer. Applicants have discovered that when phthalic anhydride, aniline, trimellitic anhydride or a mixture of these is added to the polymer of this invention, the flow is greatly improved.

The general object of this invention is to provide amide-imide and polyamide copolymers comprising about 1 to about 10 percent phthalic anhydride moieties, aniline moieties, trimellitic anhydride moieties or a mixture of two or more of these moieties. A more specific object of this invention is to provide polyamide-imide polymers prepared from aromatic diamines such as 2,2-bis(4-p-aminophenoxy)phenyl)propane, bis(4-(p-aminophenoxy)phenyl)sulfone, m-phenylene diamine, oxybis(aniline), m-toluene diamine, neopentene diamine and 2,2,2, trimethylhexamethylene diamine or a mixture containing any two or more of thee diamines, and mixtures of an acylhalide derivative of an aromatic tricarboxylic anhydride and about 1 to about 10 percent phthalic anhydride, aniline, trimellitic anhydride or a mixture of these wherein the physical properties of said polymers are optimal as molded and do not require an annealing step to enhance physical properties and said polymer can be remolded if annealed. A more specific object of this invention is to provide a polyamide-imide polymer with improved melt flow properties said polymer produced from bis(4-(p-aminophenoxy)phenyl)sulfone, 4-trimellitoyl anhydride chloride, about 1 to about 10 percent aniline as a capping agent and about 1 to about 5 weight percent of an amorphous polyamide. Another object of this invention is to provide a process for incorporating 1 to about 10 percent phthalic anhydride, aniline, trimellitic anhydride, or a mixture of these into polyamide-imide polymers. Other objects appear hereinafter.

The use of polyamide-imide polymers as engineering plastics has been limited by the relatively high cost of the polyamide-imides and to a lesser extent by the post molding annealing process to enhance the physical properties of the molded polyamide-imide parts. Thus, when the inherent cost of polyamides-imides is decreased and/or when a polyamide-imide is discovered that does not require a post molding heat treating or solid stating step, hereinafter referred to as annealing, to obtain optimal physical properties, the commercial application of these polymers will be greatly expanded. The polyamide-imide polymers of this invention have significant cost advantages over prior art compositions and in addition the as-molded physical properties of parts produced from the polyamide-imide of this invention are optimal as-molded and do not require an annealing step to enhance the physical properties.

The improved polyamide-imide polymers of this invention are prepared by reacting a mixture of an acyl halide derivative of an aromatic tricarboxylic acid anhydride with one aromatic diamine, a mixture of aromatic diamines, or a mixture of aromatic aliphatic diamines. The resulting polymers are polyamides wherein the linking groups are predominantly amide groups, although some may be imide groups, and wherein the structure contains free carboxylic acid groups which are capable of further reaction. Such polyamides are moderate molecular weight polymeric compounds having, in their molecule, units of:

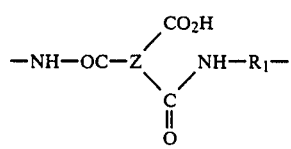

and units of:

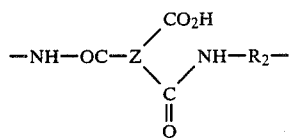

and, optionally, units of:

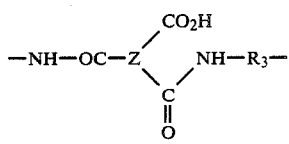

wherein the free carboxyl groups are ortho to one amide group, Z is an aromatic moiety containing 1 to 4 benzene rings or lower-alkyl-substituted benzene rings and wherein $R_1$, $R_2$ and $R_3$ are the same for homopolymers and are different for copolymers and are divalent aromatic or aliphatic hydrocarbon radicals. These hydrocarbon radicals may be a divalent aromatic or aliphatic hydrocarbon radical of from 6 to about 10 carbon atoms, or two divalent aromatic hydrocarbon radicals each of from 6 to about 10 carbon atoms joined directly or by stable linkages such as —O—, methylene, —CO—, —SO$_2$—, —S—; for example, —R'—O—R'—, —R'—CH$_2$—R'—, —R'—CO—R'—, —R'—SO$_2$—R'— and —R'—S—R'—.

Said polyamides are capable of substantially complete imidization by heating, by which they form the polyamide-imide structure having, to a substantial extent, recurring units of:

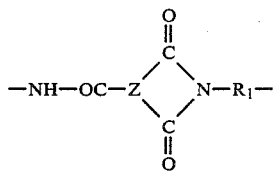

and units of:

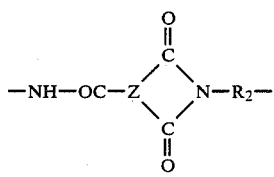

and, optionally, units of:

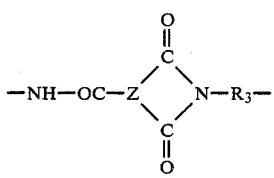

wherein one carbonyl group is meta to and one carbonyl group is para to each amide group and wherein Z, $R_1$, $R_2$ and $R_3$ are defined as above. Typical copolymers of this invention have up to about 50 percent imidization prior to annealing, typically about 10 to about 40 percent.

We can use a single diamine but, usefully, the mixture of diamines contains two or more, preferably two or three, wholly- or largely-aromatic primary diamines. More particularly, they are wholly- or largely-aromatic primary diamines containing from 6 to about 10 carbon atoms or wholly- or largely-aromatic primary diamines composed of two divalent aromatic moieties of from 6 to about 10 carbon atoms, each moiety containing one primary amine group, and the moieties linked directly or through, for example, a bridging —O—, —S—, —SO$_2$—, —CO—, or methylene group.

Preferably, the mixture of primary aromatic diamines comprises 2,2-bis[4-(p-aminophenoxy)phenyl]propane, bis[4-(p-aminophenoxy)phenyl]sulfone or a mixture of these in combination with diamines such as m-phenylene diamine, oxybis(aniline), neopentane diamine, trimethylhexamethylene diamine and the like. The preferred diamines for homo- and copolymers have the following formulae, 2,2-bis[4-(p-aminophenoxy)phenyl]propane, hereinafter referred to as BAPP,

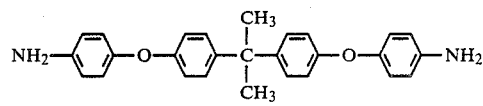

and bis[4-(p-aminophenoxy)phenyl]sulfone hereinafter referred to as BAPS.

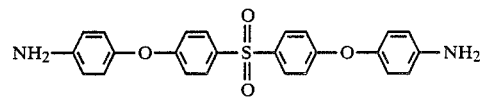

In the one-component system, the preferred diamines are oxybis(aniline), or meta-phenylenediamine. The aromatic nature of the diamines provides the excellent thermal properties of the copolymers while the primary amine groups permit the desired imide rings and amide linkages to be formed.

Usually, the polymerization or copolymerization is carried out in the presence of a nitrogen-containing organic polar solvent such as N-methylpyrrolidone (NMP), N,N-dimethylformamide, or N,N-dimethylacetamide. The reaction should be carried out under substantially anhydrous conditions and at a temperature below about 150° C. Most advantageously, the reaction is carried out from about 30° C. to about 50° C.

The reaction time is not critical and depends primarily on the reaction temperature. It may vary from about 1 to about 24 hours, with about 2 to 4 hours at about 30° C. to about 50° C. preferred in the nitrogen-containing solvents.

Polyamide-imide polymers synthesized via the polycondensation of BAPS with trimellitic anhydride acid chloride (4-TMAC) have been shown to produce a unique polyamide-imide that does not require an annealing step to produce optimal physical properties. Long term thermal aging and annealing studies completed on the polyamide-imide have shown that the physical properties values remain relatively constant during annealing. This is in contrast to polyamide-imides prepared from 4-TMAC, oxybis(aniline) and m-phenylenediamine or from 4-TMAC, isophthalic acid and m-phenylenediamine in which an annealing heat treatment step is used to enhance the physical properties of the molded parts.

Furthermore, articles fabricated from polyamide-imide polymers based on BAPS may be remolded even after exposure to elevated temperature. This is in contrast to polyamide-imides described above that contain m-phenylenediamines which cannot be remolded or reworked due to imidization and/or crosslinking occurring during the post molding annealing treatment.

The polyamide-imide polymers based on BAPS do indicate that molecular weight appreciation takes place during molding and solid stating as evidenced by increased intrinsic viscosity of the polymer. Monofunctional end-capping reagents such as phthalic anhydride, aniline, trimellitic anhydride, and benzoyl chloride have been demonstrated to be useful in restricting the intrinsic viscosity appreciation of the polyamide-imide polymer during molding and annealing. Unexpectedly, about 1% to about 10% aniline and preferably about 1% to about 5% aniline was found to give significant improvements in polymer physical properties and in polymer melt processing by limiting the appreciation of the polymer melt viscosity.

The polyamide-imide resin composition of the present invention may optionally contain fillers. Fillers are added in order to improve heat resistance, mechanical properties, resistance to chemical substances, abrasion characteristics, electrical characteristics, flame retardation, etc. Suitable fillers include synthetic and natural compounds which are stable at temperatures of at least 300° C., such as graphite, carborundum, silicon powder, molybdenum disulfide, fluorocarbon resin, glass fibers, carbon fibers, boron fibers, silicon carbide fibers, carbon whiskers, asbestos fibers, asbestos, metal fibers, antimony trioxide, magnesium carbonate, calcium carbonate, barium sulfate, silica, calcium metalsilicate, powders of metals such as iron, zinc, aluminum and copper, glass beads, glass balloons, alumina, talc, diatomaceous earth, clay, kaolin, gypsum, calcium sulfite, hydrated alumina, mica, other various kinds of metal oxides, inorganic pigments, etc.

a mortar, Henschel mixer, ball mill or ribbon blender, and then supply the premix materials to the melt mixer.

Polyamide-imides prepared from 4-TMAC and BAPS, BAPP or mixtures of BAPS and BAPP with or without other diamines such as oxybisaniline, m-phenylenediamine, p,p'-methylene bis(aniline), neopentane diamine, trimethylhexamethylene diamine with an end capping reagent such as phthalic anhydride, trimellitic anhydride, aninile or benzoyl chloride, produce a polyamide-imide which does not require a solid stating or annealing step after molding to produce enhanced mechanical properties. However, these polyamide-imide polymers do exhibit extremely high melt viscosities making these polymers difficult to melt fabricate.

The processability of these end-capped BAPS containing amide-imide polymers can be significantly improved when these polymers are alloyed with one or more secondary polymer components with the secondary polymer components containing imide, ester, sulfone, amide or ether moieties.

Representative secondary polymer components by tradename included: Ardel D100, a polyarylate produced by Union Carbide Corp.; Radel A400, a polyarylsulfone produced by Union Carbide Corp.; Udel P1700, a polysulfone produced by Union Carbide Corp.; Victrex 5200, a polyethersulfone produced by ICI Inc.; and Ultem 1000, a polyetherimide produced by General Electric, Inc.

We have found that alloying about 1 to about 40 percent of a secondary polymer component listed above improves the melt flow properties of polyamide-imides prepared from BAPS, 4-TMAC with about 3 mole percent aniline as a capping agent, the latter polymer more conveniently referred to as BAPS/TMA-3% Aniline polyamide-imide hereinafter.

Additionally, it has been found that a particularly good balance of molded part physical properties and improvement of polymer melt flow properties is obtained when about 1 to about 5 percent by weight of an amorphous polyamide with the following recurring structure;

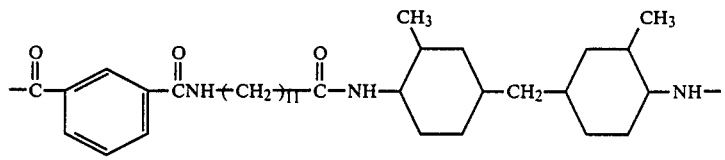

For mixing and preparing compositions of the present invention containing fillers, it is possible to utilize an apparatus used for melt blending ordinary rubber or plastics, for example, Banbury mixers, brabenders and extruders. The mixing operations are continued until a uniform blend is obtained. The melt blending temperature is established at a value which is more than the temperature at which the blend system can be melted, but is less than the temperature at which thermal decomposition of the blend system begins. Melt blending temperatures are normally selected from the range of 250°–400° C., and preferably from the range of 300°–380° C.

Upon mixing and preparing filled compositions of the present invention, it is possible to separately supply the aromatic polyamide-imide resin, an optional thermoplastic resin component and optional fillers to the melt mixer. It is also possible to premix these materials using was alloyed with the BAPS/TMA-3% Aniline polyamide-imide. The amorphous polyamide described above is manufactured by American Grilon Inc. under tradename of Grilamid TR 55 and was also marketed by Union Carbide Corporation under tradename of amidel. Trogamid-T, produced by Dynamit Nobel, has also been used.

The composition of the present invention forms a uniform melt blend and may be shaped by injection molding, extrusion molding, compression molding, or sintering molding.

For producing shaped articles utilizing injection molding or extrusion molding, machines equipped with a screw cylinder to promote excellent melt blending performance, it is not always necessary to separately prepare the blending composition in advance. By directly supplying the component materials to the screw hopper, either separately or after dry blending thereof, a shaped article of a uniform composition may be produced in one stage. However, the desired uniform blend can be more easily obtained by a two-stage blending method in which master-batch pellets are prepared by melt blending the filler with or without a secondary polymer component and desired thermoplastic resin component in advance, and then the master-batch pellets are further melt blended with the polyamide-imide resin component.

Shaped articles obtained by melt molding the heat resistant molding resin composition of the present invention exhibit excellent properties in terms of heat resistance, mechanical characteristics, electrical characteristics, sliding characteristics and solvent resistance characteristics, and may be utilized in many ways. They are useful as, for example, auto parts, electrical and electronic parts, water supplying and distributing machine parts, office machine parts, aircraft parts, and special machine parts.

Injection molding of the polyamide-imide polymer of the instant invention is accomplished by injecting the copolymer into a mold maintained at a temperature of about 300° to 450° F. In this process a 25 to 28 second cycle is used with a barrel temperature of about 600° to 700° F. The injection molding conditions are given in Table I.

TABLE 1

| Mold Temperature | 350° F. to 450° F. |
|---|---|
| Injection Pressure | 15,000 to 19,000 psi and held for 1 to 3 seconds |
| Back Pressure | 100 to 220 psi |
| Cycle Time | 25 to 28 seconds |
| Extruder: Nozzle Temperature | 600° F. to 700° F. |
| Barrels: Front heated to | 600° F. to 700° F. |
| Screw: | 20 to 25 revolutions/min. |

Cavity pressure measurements are used as quality control checks of polyamide-imide resin viscosity. Pressure buildup during the filling of an injection molded part is measured at a point in the cavity (ejector pin). This is accomplished by placing a pressure transducer behind the ejector pin and recording the pressure with a chart recorder or other readout device. Cavity pressure normally rises as the mold is being filled and peaks as the molten resin is packed into the cavity. As the resin solidifies, cavity pressure decreases.

We have found that resins that have low cavity pressures process poorly and that spiral flow measurements were not sensitive enough to discriminate between resins in the viscosity range of interest. Low cavity pressures indicate a large pressure drop between injection and cavity pressures. This indicates higher resin viscosities. In the same manner, high cavity pressures indicate less pressure change between injection and cavity pressures, suggesting lower resin viscosities.

Amide-imide polymer and copolymer viscosities had been measured by spiral flow determinations previous to the implementation of the cavity pressure procedure, see U.S. Pat. No. 4,224,214. Cavity pressure was selected over spiral because of its greater sensitivity. The cavity pressure test has been implemented as an amide-imide homopolymer and copolymer quality control procedure. Like spiral flow, cavity pressure is a test that can be done conveniently in a molder's shop.

A 40 MM Battenfield injection molding press can be used to evaluate the flow characteristics of a polymer at various fill rates and temperatures by measuring the flow time and pressure drop in the cavity. Table 1 above illustrates the processing conditions used to measure the polymer melt flow properties. The barrel temperature is maintained at a given temperature, 650° or 700° F., to obtain the melt viscosity measured in poises at the given temperature. A Daytronic 9010 open-loop mainframe monitor was used to measure the cavity pressure and fill time between the sprue and the dead-end of the flexural bars. Pressure transducers were fitted behind the knockout pins in the sprue and at the dead end of the flexural bar. The actual measurements were taken at the onset of the pressure rise at the dead end of the flexural cavity. The time to fill the cavity and the change in the pressure between the knockout pins is recorded and a melt viscosity is estimated at a given barrel temperature by multiplying the time and change in pressure with a device geometry constant. The constant is dependent on the mold geometry.

Resins were dried in a vacuum (2 mm Hg) oven at 300° F. for at least 16 hours before testing. Moisture in amide-imide polymers has a very significant effect on its flow properties, therefore special care was taken to be sure the samples were properly dried. This drying procedure was used before making flow rate and cavity pressure measurements.

The flow rate procedure was patterned after the standard method described in ASTM D1238. A 335° C. (635° F.) barrel temperature with a 30 minute preheat time was used. This is about the largest set of weights that can be used safely with the standard extrusion plastometer apparatus with a standard 0.0825 in. diameter, and a 0.315 in. long orifice.

Special care was taken to be sure that each flow rate measurement was started when an equivalent volume of resin was in the barrel. Previous rheology work indicated that there is a very large "barrel height" effect on amide-imide homopolymers and copolymers. Each flow rate measurement was initiated while the top of the piston collar was between the two scribe marks on the piston. This precaution is also required by ASTM in method D1238.

The physical properties and test methods were as follows: Tensile Properties (ASTM D1708); Izod Impact (ASTM D256); Heat Deflection Temperature (ASTM 48); Inherent Viscosity (0.5 percent in NMP at 25° C.); Absorbed water (equilibrium value at 160° F.).

The following Examples illustrate the preferred embodiments of this invention. It will be understood that these Examples are for illustrative purposes only and do not purport to be wholly definitive with respect to the conditions or scope of the invention.

EXAMPLE 1

A 1000-ml roundbottom, 3-necked flask equipped with a paddle stirrer, nitrogen inlet and thermometer was charged with 102.6 parts by weight (pbw) of BAPP, 0.96 pbw of trimellitic anhydride (TMA) and 398.8 pbw of N-methylpyrrolidone (NMP). After solution had occurred under a nitrogen purge, 51.6 pbw of 4-trimellitoyl anhydride chloride (4-TMAC) was added over 1.5 hours with the temperature maintained below 35° C. The temperature of the resulting viscous solution was brought to 50° C. When the Gardner-Holdt viscosity had reached a Z5(−) viscosity the solution was precipitated by pouring into a Waring blender containing 1000 ml of deionized water. The polymer product was washed five times with deionized water followed by air drying on a filter, heat treatment for 16 hours at 80°–90° C. (22 mm Hg), and finally heating for six hours at 400°–450° F. The physical properties of the polymer prepared in this experiment are set forth in Tables 2–4.

EXAMPLE 2

This example is the same as Example 1 except that 1.92 pbw of TMA were added as the capping agent, and 50.5 pbw of 4-TMAC were used. The physical properties of the polymer prepared in this experiment are set forth in Tables 2–4.

EXAMPLE 3

A 1000-ml roundbottom, 3-necked flask equipped with a paddle stirrer, nitrogen inlet and thermometer was charged with 102.6 pbw of BAPP, 0.37 pbw of phthalic anhydride (PA) and 398.8 pbw of NMP. After solution had occurred under a nitrogen purge, 52.1 pbw of 4-TMAC were added over 1.5 hours while keeping the temperature below 35° C. The temperature of the resulting viscous solution was brought to 50° C. When the Gardner-Holdt viscosity had reached a Z5(−) viscosity the solution was precipitated by pouring into a Waring blender containing 1000 ml of deionized water. The polymer product was washed five times with deionized water followed by air-drying on a filter, heat treatment for 16 hours at 80°–90° C. (22 mm Hg), and finally heating for six hours at 400°–450° F. The results of this experiment are set forth in Tables 2–4.

EXAMPLE 4

The example is the same as Example 3 except that 1.11 pbw of PA were added as the capping agent, and 51.06 pbw of 4-TMAC were used. The physical properties of the polymer prepared in this experiment are set forth in Tables 2–4.

EXAMPLE 5

This example is the same as Example 3 except that 2.23 pbw of PA were added as the capping agent, and 49.5 pbw of 4-TMAC were used. The physical properties of the polymer prepared in this experiment are set forth in Tables 2–4.

EXAMPLE 6

This example is the same as Example 1 except that 3.38 pbw of TMA were added as the capping agent, and 48.9 pbw of 4-TMAC were used. The physical properties of the polymer prepared in this experiment are set forth in Tables 2–4.

EXAMPLE 7

A 1000-ml roundbottom, 3-necked flask equipped with a paddle-stirrer, nitrogen inlet and thermometer was charged with 636.9 pbw of NMP, 173.6 pbw of BAPP and 1.2 pbw of aniline was added. After solution had occurred under a nitrogen purge, 91.8 pbw of 4-TMAC was added over 1.5 hours keeping the temperature below 35° C. The temperature of the resulting viscous solution was brought to 50° C. When the Gardner-Holdt viscosity had reached a Z5(−) viscosity the solution was precipitated by pouring into a Waring blender containing 1000 ml of deionized water. The polymer product was washed five times with deionized water followed by air-drying on a filter, heat treated for 16 hours at 80°–90° C. (22 mm Hg), and finally heated for six hours at 400°–450° F. The physical properties of the polymer prepared in this experiment are set forth in Tables 2–4.

EXAMPLE 8

This example is the same as Example 3 except that 3.73 pbw of PA were added as the capping agent, and 47.3 pbw of 4-TMAC were used. The physical properties of the polymer prepared in this experiment are set forth in Tables 2–4.

EXAMPLE 9

This example is the same as Example 7 except that 2.38 pbw of aniline were added as the capping agent, and 168.2 pbw of BAPP were used. The physical properties of the polymer prepared in this experiment are set forth in Tables 2–4.

CONTROL EXAMPLE

A 1000-ml roundbottom, 3-necked flask equipped with a paddle stirrer, nitrogen inlet and thermometer was charged with 150.0 pbw of BAPP, and 430 pbw of NMP. After solution had occurred under a nitrogen purge, 76.9 pbw of 4-trimellitoyl anhydride chloride (4-TMAC) and 56 pbw of NMP was added over 3.0 hours with the temperature maintained below 35° C. The temperature of the resulting viscous solution was brought to 50° C. for 2 hours. When the Gardner-Holdt viscosity had reached a Z5(−) viscosity, the solution was precipitated by pouring into a Waring blender containing 1000 ml of deionized water. The polymer product was washed five times with deionized water followed by air drying on a filter, heat treated for 16 hours at 80°–90° C. (22 mm Hg), and finally heated for six hours at 400°–450° F. The physical properties of the polymer prepared in this experiment are set forth in Tables 2–4.

TABLE 2

BAPP Based Polyamide-imides - Capping Experiments

| Example No. | Capping Agent | | | Solution Viscosity Gardner-Holdt |
|---|---|---|---|---|
| | Aniline, % | TMA, % | PA, % | |
| 1 | 0 | 2 | 0 | Z5(−) |
| 2 | 0 | 4 | 0 | Z4 |
| 3 | 0 | 0 | 1 | Z5(−) |
| 4 | 0 | 0 | 3 | Z3(+) |
| 5 | 0 | 0 | 6 | Z4 |
| 6 | 0 | 7 | 0 | Z4(−) |
| 7 | 3 | 0 | 0 | Z5(−) |
| 8 | 0 | 0 | 10 | Z |
| 9 | 6 | 0 | 0 | Z1(+) |
| Control | 0 | 0 | 0 | Z5(−) |

| | Polymer Inherent Viscosity (IV) | | |
|---|---|---|---|
| Example No. | Reaction[1] dl/g | Dried[2] dl/g | Cured[3] dl/g |
| 1 | 0.36 | 0.67 | 1.04 |
| 2 | 0.35 | 0.47 | 0.88 |
| 3 | 0.37 | 0.73 | 1.39 |
| 4 | 0.32 | 0.61 | 0.87 |
| 5 | 0.32 | 0.51 | 0.67 |
| 6 | 0.32 | 0.46 | 0.91 |
| 7 | 0.31 | 0.55 | 0.70 |
| 8 | 0.27 | 0.36 | 0.42 |
| 9 | NM | 0.43 | 0.45 |
| Control | 0.25 | 0.50 | 0.74 |

[1]On polymer dried 16 hours @ 80–90° C. (22 mm Hg).
[2]Reaction polymer heated for 16 hours @ 180° C. and 0.2 mm Hg.
[3]Dried polymer heated for 6 hours @ 400°–450° F.
NM - not measured

TABLE 3

BAPP Based Polyamide-imides - Physical Properties

| Example No. | Capping Level | Molding Temp., °F. | Ultimate Tensile Strength, psi |
|---|---|---|---|
| 1 | 2% TMA | 580 | 13,100 |
| 2 | 4% TMA | 560 | 13,400 |
| 3 | 1% PA | 580 | 13,700 |
| 4 | 3% PA | 560 | 13,300 |
| 5 | 6% PA | 550 | 12,700 |
| 6 | 7% TMA | 560 | 13,000 |
| 7 | 3% Aniline | 570 | 13,100 |
| 8 | 10% PA[1] | NM | NM |
| 9 | 6% Aniline | 510 | 12,300 |
| Control | 0 | 560 | 13,200 |

| Example No. | Ultimate Tensile Elongation, % | Notched Izod ft-lb/in. |
|---|---|---|
| 1 | 60 | 3.6 |
| 2 | 59 | 2.7 |
| 3 | 65 | 4.2 |
| 4 | 65 | 2.8 |
| 5 | 45 | 1.7 |
| 6 | 56 | 1.3 |
| 7 | 36 | 3.1 |
| 8 | NM | NM |
| 9 | 26 | 0.2 |
| Control | 57 | NM |

[1]Polymer degraded
NM - not measured

TABLE 4

BAPP Based Polyamide-imides - Melt Flow[1] Data

| Example No. | Capping Level | Melt Flow at 510° F. g/10 min. | Melt Flow at 560° F. g/10 min. |
|---|---|---|---|
| 1 | 2% TMA | 0 | <20 |
| 2 | 4% TMA | 5 | 52 |
| 3 | 1% PA | 0 | <5 |
| 4 | 3% PA | 7 | 71 |
| 5 | 6% PA | 20 | 200 |
| 6 | 7% TMA | 25 | 312 |
| 8 | 10% PA[2] | NM | NM |
| 9 | 6% Aniline | 14 | 142 |
| Control | 0 | 23 | 288 |

[1]Die - 1" × 5/16", ⅛" orifice, 5000 psi.
[2]Polymer degraded
NM - not measured Preparation of Polyamide-imide based on BAPS A process quite similar to the preparation in Example 1 was utilized. The 4-TMAC was added to a solution of one or more diamines and capping agent (if added) in N-methylpyrrolidone. After addition was complete, NMP was used at a level to obtain a solution of 28% polymer solids. The solution was heated at 50° C. for one hour then precipitated in water. After thorough washing, the product was dried on a Buchner funnel, dried in a vacuum oven at 80° C. for approximately sixteen hours, and then heated for six hours at 400°–450° F. Melt flow values (⅛" orifice, 5,000 psi on 1" ram, 540° F.), as well as compression molded plaques, were obtained from samples given a six-hour (400°–450° F.) heat-treatment cycle.

EXAMPLE 10

A 2000-ml roundbottom, 4-necked flask equipped with a paddle stirrer, nitrogen inlet and thermometer was charged with 227.0 grams of BAPS prepared in the laboratory and having greater than 99% purity and 736.8 grams of NMP. After solution had occurred under a nitrogen purge, 110.5 grams of 4-TMAC were added over 1.5 hours with the temperature maintained below 35° C. The remaining 81.9 grams of NMP were used to wash the 4-TMAC from the container that held the 4-TMAC and the NMP solution was added to the flask. The temperature of the resulting viscous solution was brought to 50° C. When the Gardner-Holdt viscosity had reached a Z8(−) viscosity, the solution was precipitated by pouring into a Waring blender containing 1000 ml of deionized water. The polymer product was washed five times with deionized water followed by drying over the weekend at 85° C. with an air sweep at a vacuum at 13 in. Hg. The polymer was then vacuum dried (0.15 mm Hg) for 16 hours at 180° C. After that, the polymer was heated for two hours each at 400°, 425° and 450° F. The yield of polymer was 275 grams. The results of this experiment are set forth in Table 5.

EXAMPLE 11

A 2000-ml roundbottom, 4-necked flask equipped with a paddle stirrer, nitrogen inlet and thermometer was charged with 227.1 grams of BAPS and 735.9 grams of NMP. After solution had occurred under a nitrogen purge, 2.3 grams of phthalic anhydride (PA), corresponding to an amount equal to 3 mole percent of the total diamine added, and 107.2 grams of 4-TMAC were added over 1.5 hours keeping the temperature below 35° C. The remaining 81.8 grams of NMP were used to wash the container that held the 4-TMAC and the NMP solution containing the 4-TMAC was added to the flask. The temperature of the resulting viscous solution was brought to 50° C. When the Gardner-Holdt viscosity and reached a Z7(−) viscosity, the solution was precipitated by pouring into a Waring blender containing 1000 ml of deionized water. The polymer product was washed five times with deionized water followed by drying overnight at 85° C. with an air sweep at a vacuum of 13 in. Hg. The polymer was then vacuum dried (0.15 mm Hg) for 16 hours at 180° C. After that, the polymer was heated for two hours each at 400°, 425° and 450° F. The yield of polymer was 277 grams. The results of this experiment are set forth in Table 5.

EXAMPLE 12

A 2000-ml roundbottom, 4-necked flask equipped with a paddle stirrer, nitrogen inlet and thermometer was charged with 227.1 grams of BAPS and 735.9 grams of NMP. After solution had occurred under a nitrogen purge, 4.0 grams of trimellitic anhydride (TMA) corresponding to an amount equal to 4 mole percent of the total diamine added, and 106.1 grams of 4-TMAC were added over 1.5 hours keeping the temperature below 35° C. The remaining 81.8 grams of NMP were used to wash the container that held the 4-TMAC and the solution containing NMP and 4-TMAC was added to the flask. The temperature of the resulting viscous solution was brought to 50° C. When the Gardner-Holdt viscosity had reached a Z6(+) viscosity, the solution was precipitated by pouring into a Waring blender containing 1000 ml of deionized water. The polymer product was washed five times with deionized water followed by drying overnight at 85° C. with an air sweep at a vacuum of 13 in. Hg. The polymer was then vacuum dried (0.15 mm Hg) for 16 hours at 180° C. After that, the polymer was heated for two hours each at 400°, 425° and 450° F. The yield of polymer was 282 grams. The results of this experiment are set forth in Table 5.

EXAMPLE 13

A 2000-ml roundbottom, 4-necked flask equipped with a paddle stirrer, nitrogen inlet and thermometer was charged with 220.2 grams of BAPS and 726.5 grams of NMP. After solution had occurred under a nitrogen purge, 2.3 grams of aniline (AN) corresponding to an amount equal to 3 mole percent of the total diamine added, and 110.5 grams of 4-TMAC were added over 1.5 hours with the temperature maintained below 35° C. The remaining 80.7 grams of NMP were used to wash the container that held the 4-TMAC and the NMP solution was added to the flask. The temperature of the resulting viscous solution was brought to 50° C. When the Gardner-Holdt viscosity had reached a Z6(+) viscosity, the solution was precipitated by pouring into a Waring blender containing 1000 ml of deionized water. The polymer product was washed five times with deionized water followed by drying over the weekend at 80° C. with an air sweep at a vacuum of 13 in. Hg. The polymer was then vacuum dried (0.15 mm Hg) for 16 hours at 180° C. After that, the polymer was heated for two hours each at 400°, 425° and 450° F. The results of this experiment are set forth in Table 5.

EXAMPLE 14

A 2000-ml roundbottom, 4-necked flask equipped with a paddle stirrer, nitrogen inlet and thermometer was charged with 227.1 grams of BAPS and 735.2 grams of NMP. After solution had occurred under a nitrogen purge, 4.7 grams of PA, corresponding to an amount equal to 6 mole percent of the total diamine added, and 103.9 grams of 4-TMAC were added over 1.5 hours keeping the temperature below 35° C. The remaining 81.7 grams of NMP were used to wash the container that held the 4-TMAC and the NMP solution was added to the flask. The temperature of the resulting viscous solution was brought to 50° C. When the Gardner-Holdt viscosity had reached a Z5(−) viscosity, the solution was precipitated by pouring into a Waring blender containing 1000 ml of deionized water. The polymer product was washed five times with deionized water followed by drying overnight at 85° C. with an air sweep at a vacuum of 13 in. Hg. The polymer was then vacuum dried (0.15 mm Hg) for 16 hours at 180° C. After that, the polymer was heated for two hours each at 400°, 425° and 450° F. The results of this experiment are set forth in Table 5.

EXAMPLE 15

A 2000-ml roundbottom, 4-necked flask equipped with a paddle stirrer, nitrogen inlet and thermometer was charged with 227.1 grams of BAPS and 738.3 grams of NMP. After solution had occurred under a nitrogen purge, 6.0 grams of TMA corresponding to an amount equal to 6 mole percent of the total diamine added, and 103.9 grams of 4-TMAC were added over 1.5 hours keeping the temperature below 35° C. The remaining 82.0 grams of NMP were used to wash the container that held the 4-TMAC and the NMP solution was added to the flask. The temperature of the resulting viscous solution was brought to 50° C. When the Gardner-Holdt viscosity had reached a Z5 viscosity, the solution was precipitated by pouring into a Waring blender containing 1000 ml of deionized water. The polymer product was washed five times with deionized water followed by drying overnight at 85° C. with an air sweep at a vacuum of 13 in. Hg. The polymer was then vacuum dried (0.15 mm Hg) for 16 hours at 180° C. After that, the polymer was heated for two hours each at 400°, 425° and 450° F. The results of this experiment are set forth in Table 5.

EXAMPLE 16

A 2000-ml roundbottom, 4-necked flask equipped with a paddle stirrer, nitrogen inlet and thermometer was charged with 215.7 grams of BAPS and 719.7 grams of NMP. After solution has occurred under a nitrogen purge, 3.9 grams of AN corresponding to an amount equal to 5 mole percent of the total diamine added, and 110.5 grams of 4-TMAC were added over 1.5 hours keeping the temperature below 35° C. The remaining 80.0 grams of NMP were used to wash the container that held the 4-TMAC and the NMP solution was added to the flask. The temperature of the resulting viscous solution was brought to 50° C. When the Gardner-Holdt viscosity had reached a Z2(−) viscosity, the solution was precipitated by pouring into a Waring blender containing 1000 ml of deionized water. The polymer product was washed five times with deionized water followed by drying over the weekend at 80° C. with an air sweep at a vacuum of 13 in. Hg. The polymer was then vacuum dried (0.15 mm Hg) for 16 hours at 180° C. After that, the polymer was heated for two hours each at 400°, 425° and 450° F.

Excellent properties were generated for the 3% aniline capped product. The results of this Experiment are set forth in Table 5.

TABLE 5

| Capped BAPS/TMA Polymers | | | | | | |
|---|---|---|---|---|---|---|
| | Capping Agent | | | Polymer Inherent Viscosity | | |
| Example No. | PA % | TMA % | AN % | Initial dl/g | Dried dl/g | Cured dl/g |
| 10 | 0 | 0 | 0 | 0.37 | 0.44 | 0.67 |
| 11 | 3 | 0 | 0 | 0.25 | 0.48 | 0.68 |
| 12 | 0 | 4 | 0 | 0.32 | 0.44 | 0.56 |
| 13 | 0 | 0 | 3 | 0.26 | 0.35 | 0.50 |
| 14 | 6 | 0 | 0 | 0.22 | 0.26 | 0.46 |
| 15 | 0 | 6 | 0 | 0.23 | 0.39 | 0.49 |
| 16 | 0 | 0 | 5 | 0.26 | 0.33 | 0.47 |

| Example No. | Melt Flow at 540° F. g/10 min | Ultimate Tensile | |
|---|---|---|---|
| | | Strength psi | Elongation % |
| 10 | 3.1 | 13,100 | 23.6 |
| 11 | 5.2 | 12,700 | 23.4 |
| 12 | 19.1 | 12,500 | 37.0 |
| 13 | 8.1 | 13,000 | 37.9 |
| 14 | 12.5 | NM | NM |
| 15 | 4.4 | 10,300 | 3.6 |
| 16 | 2.9 | 9,000 | 2.7 |

| Example No. | Yield Tensile | | Tg °C. | Notched Izod ft-lb/in |
|---|---|---|---|---|
| | Strength psi | Elongation % | | |
| 10 | NM | NM | 274 | 4.32 |
| 11 | 14,100 | 11.4 | 267 | 3.15 |
| 12 | 14,300 | 11.2 | 263 | 1.21 |
| 13 | 14,100 | 11.3 | 270 | 4.19 |
| 14 | NM | NM | NM | NM |
| 15 | NM | NM | NM | 0.45 |
| 16 | NM | NM | NM | 1.86 |

NM - not measured

EXAMPLE 17

A 50-gallon reactor equipped with an agitator, nitrogen inlet, and thermocouple was flushed with nitrogen and then charged with 128.0 pounds of NMP and cooled to 65° F. To the cooled NMP, 39.83 lbs. of BAPS were added and the mixture was agitated for 30 minutes. After all the BAPS was in solution, 20.0 lbs. of 4-TMAC in flake form were added to the mixture over a time period of 1.5 hours with the mixture temperature maintained between 65° and 77° F. Aniline was added to the mixture at a molar ratio representing 3 percent of the diamine added to the mixture, 120.4 gm. The aniline was followed by the addition of 14 lbs. of NMP to assure that the aniline was completely in the system. The mixture was heated to 122° F. and maintained at that temperature for two hours. The reactor was then cooled to 77° F. and the polymer was precipitated in deionized water. The precipitated polymer was milled and washed with deionized water. Following the final wash, the wet cake was centrifuged to remove excess water. The polymer was then heated at 300° F. for 3 hours followed by heat treating at 450° F. The BAPS-based polyamide-imide polymer capped with 3% Aniline produced a polymer with an inherent viscosity of 0.58 dl/g. The final dry weight of the polyamide-imide produced was 53 lbs. for a 94 percent yield.

EXAMPLE 18

The BAPS/TMA-3% aniline polyamide-imide prepared as described in Example 17 was blended with an amorphous polyamide, Amidel, in the ratio of 2.925 pounds of BAPS-based polyamide-imide to 0.075 pounds of Amidel in a drum. The blend containing 2.5 percent by weight of Amidel was mixed on a drum roller for 1 hour and then melted and pelletized using a Werner-Pfleiderer ZSK-30 twin-screw extruder. Melt viscosity, physical properties, thermal properties and moisture absorption data were obtained and are presented in Table 6.

EXAMPLE 19

The BAPS/TMA-3% aniline polyamide-imide prepared as described in Example 17 was blended with an amorphous polyamide Trogamid-T, in the ratio of 2.925 pounds of BAPS-based polyamide-imide to 0.075 pounds of Trogamid-T in a drum. The blend containing 2.5 percent by weight of Trogamid-T was mixed on a drum roller for 1 hour and then melted and pelletized using a Werner-Pfleiderer ZSK-30 twin-screw extruder. Melt viscosity, physical properties, thermal properties and moisture absorption data were obtained and are presented in Table 6.

EXAMPLE 20

The BAPS/TMA-3% aniline polyamide-imide prepared as described in Example 17 was blended with an amorphous polyamide, Amidel, in the ratio of 2.7 pounds of BAPS-based polyamide-imide to 0.3 pounds of Amidel in a drum. The blend containing 10 percent by weight of Amidel was mixed on a drum roller for 1 hour and then melted and pelletized using a Werner-Pfleiderer ZSK-30 twin-screw extruder. Melt viscosity, physical properties, thermal properties and moisture absorption data were obtained and are presented in Table 6.

EXAMPLE 21

The BAPS/TMA-3% aniline polyamide-imide prepared as described in Example 17 was blended with a polyarylate, Ardel D100, in the ratio of 2.7 pounds of BAPS-based polyamide-imide to 0.3 pounds of Ardel D100 in a drum. The blend containing 10 percent by weight of Ardel D100 was mixed on a drum roller for 1 hour and then melted and pelletized using a Werner-Pfleiderer ZSK-30 twin-screw extruder. Melt viscosity, physical properties, thermal properties and moisture absorption data were obtained and are presented in Table 6.

EXAMPLE 22

The BAPS/TMA-3% aniline polyamide-imide prepared as described in Example 17 was blended with a sulfone based polymer, Radel A400, in the ratio of 2.4 pounds of BAPS-based polyamide-imide to 0.6 pounds of Radel A400 in a drum. The blend containing 20 percent by weight of Radel A400 was mixed on a drum roller for 1 hour and then melted and pelletized using a Werner-Pfleiderer ZSK-30 twin-screw extruder. Melt viscosity, physical properties, thermal properties and moisture absorption data were obtained and are presented in Table 6.

EXAMPLE 23

The BAPS/TMA-3% aniline polyamide-imide prepared as described in Example 17 was blended with a sulfone based polymer, Radel A400, in the ratio of 1.8 pounds of BAPS-based polyamide-imide to 1.2 pounds of Radel A400 in a drum. The blend containing 40 percent by weight of Radel A400 was mixed on a drum roller for 1 hour and then melted and pelletized using a Werner-Pfleiderer ZSK-30 twin-screw extruder. Melt viscosity, physical properties, thermal properties and moisture absorption data were obtained and are presented in Table 6.

EXAMPLE 24

The BAPS/TMA-3% aniline polyamide-imide prepared as described in Example 17 was blended with a polyetherimide polymer, Ultem 1000, in the ratio of 2.4 pounds of BAPS-based polyamide-imide to 0.6 pounds of Ultem 1000 in a drum. The blend containing 20 percent by weight of Ultem 1000 was mixed on a drum roller for 1 hour and then melted and pelletized using a Werner-Pfleiderer ZSK-30 twin-screw extruder. Melt viscosity, physical properties, thermal properties and moisture absorption data were obtained and are presented in Table 6.

EXAMPLE 25

The BAPS/TMA-3% aniline polyamide-imide prepared as described in Example 17 was blended with a polyetherimide polymer, Ultem 1000, in the ratio of 1.8 pounds of BAPS-based polyamide-imide to 1.2 pounds of Ultem 1000 in a drum. The blend containing 40 percent by weight of Ultem 1000 was mixed on a drum roller for 1 hour and then melted and pelletized using a Werner-Pfleiderer ZSK-30 twin-screw extruder. Melt viscosity, physical properties, thermal properties and moisture absorption data were obtained and are presented in Table 6.

EXAMPLE 26

The BAPS/TMA-3% aniline polyamide-imide prepared as described in Example 17 was blended with a polysulfone polymer, Udel P1700, in the ratio of 2.4 pounds of BAPS-based polyamide-imide to 0.6 pounds of Udel P1700 in a drum. The blend containing 20 percent of Udel P1700 was mixed on a drum roller for 1 hour and then melted and pelletized using a Werner- Pfleiderer ZSK-30 twin-screw extruder. Melt viscosity, physical properties, thermal properties and moisture absorption data were obtained and are presented in Table 6.

EXAMPLE 27

The BAPS/TMA-3% aniline polyamide-imide prepared as described in Example 17 was blended with a polysulfone polymer, Udel P1700, in the ratio of 1.8 pounds of BAPS-based polyamide-imide to 1.2 pounds of Udel P1700 in a drum. The blend containing 40 percent by weight of Udel P1700 was mixed on a drum roller for 1 hour and then melted and pelletized using a Werner-Pfleiderer ZSK-30 twin-screw extruder. Melt viscosity, physical properties, thermal properties and moisture absorption data were obtained and are presented in Table 6.

The BAPS/TMA-3% aniline polyamide-imide prepared as described in Example 17 was blended with a polysulfone polymer, Victrex 5200, in the ratio of 1.8 pounds of BAPS-based polyamide-imide to 1.2 pounds of Victrex 5200 in a drum. The blend containing 40 percent by weight of Victrex 5200 was mixed on a drum roller for 1 hour and the melted and pelletized using a Werner-Pfleiderer ZSK-30 twin-screw extruder. Melt viscosity, physical properties, thermal properties and moisture absorption data were obtained and are presented in Table 6.

TABLE 6
BAPS/TMA-3% Aniline Polyamide-Imide Alloy Blends

| Example No. | Blend Component Type | % | Melt Viscosity 650° F. poise | Melt Viscosity 700° F. poise | Shrinkage mils/in |
|---|---|---|---|---|---|
| 17 | None | 0 | 500000 | 38000 | 7.0 |
| 18 | Amidel | 2.5 | NM | 19000 | 7.9 |
| 19 | Trogamid-T | 2.5 | NM | 31900 | 8.1 |
| 20 | Amidel | 10 | 15300 | 3700 | 5.6 |
| 21 | Ardel D100 | 10 | 47300 | 15700 | 7.7 |
| 22 | Radel A400 | 20 | NM | 30700 | 6.7 |
| 23 | Radel A400 | 40 | NM | 26500 | 5.6 |
| 24 | Ultem 1000 | 20 | 127000 | 21700 | 7.4 |
| 25 | Ultem 1000 | 40 | 51000 | 17400 | 6.6 |
| 26 | Udel P1700 | 20 | 251000 | 30000 | 8.7 |
| 27 | Udel P1700 | 40 | 104000 | 21700 | 8.3 |
| 28 | Victrex 5200 | 40 | NM | 40500 | 8.0 |

| Example No. | Tensile Strength Yield psi | Tensile Strength Break psi | Tensile Elongation Yield % | Tensile Elongation Break % |
|---|---|---|---|---|
| 17 | 16000 | 15100 | 14 | 20.2 |
| 18 | 15200 | 11300 | 12.8 | 23.3 |
| 19 | 16100 | 14900 | 13 | 19 |
| 20 | n/y | 11700 | n/y | 6.5 |
| 21 | 15600 | 13900 | 13.8 | 20.3 |
| 22 | 15200 | 13200 | 13.4 | 21.5 |
| 23 | 13800 | 11800 | 10.4 | 24 |
| 24 | 15800 | 14100 | 12 | 16 |
| 25 | 15500 | 13300 | 11.2 | 33.1 |
| 26 | n/y | 8900 | n/y | 4.5 |
| 27 | n/y | 10300 | n/y | 6.2 |
| 28 | 15800 | 11800 | 10.9 | 24 |

| Example No. | Izod Impact Strength Notched ft-lb/in | Izod Impact Strength Un-notched ft-lb/in | Dart Impact in-lbs | Tensile Impact ft-lbs |
|---|---|---|---|---|
| 17 | 3.2 | 35.0 | 18 | 186 |
| 18 | 2.9 | 17.4 | 19 | NM |
| 19 | 3.4 | 20.7 | NM | NM |
| 20 | 0.9 | 8.4 | 19 | 60 |
| 21 | 1.3 | 38.8 | 6 | 33 |
| 22 | 2.7 | 25.4 | 19 | 144 |
| 23 | 1.8 | 45.7 | 25 | 125 |
| 24 | 1.9 | 60.4 | 14 | 87 |
| 25 | 1.6 | 45.7 | 11 | 140 |
| 26 | 1.2 | 12.2 | 24 | 52 |
| 27 | 0.9 | 14.7 | 25 | 49 |
| 28 | 2.5 | 35.4 | 26 | 105 |

| Example No. | Thermal Properties HDT °F. | Thermal Properties Tg °F. | Moisture Absorption % |
|---|---|---|---|
| 17 | 459 | 505 | 3.7 |
| 18 | 438 | 500 | NM |
| 19 | 454 | 502 | 3.7 |
| 20 | 400 | 465 | 2.5 |
| 21 | 439 | 503 | 3.2 |
| 22 | 440 | 505 | 3.3 |
| 23 | 418 | 511 | 2.7 |
| 24 | 431 | 507 | 3.0 |
| 25 | 416 | 507 | 2.5 |
| 26 | 403 | 514 | 2.9 |
| 27 | 365 | 520 | 2.4 |
| 28 | 432 | 511 | 3.0 |

N/Y - no yield
NM - not measured

EXAMPLE 29

Tensile and flexural test bars molded from the polymer prepared in Example 17 were annealed at 340° F. for 24 hours, at 380° F. for 24 hours and at 425° F. for 60 hours. The physical properties of these annealed test bars are given in Table 7.

COMPARATIVE EXAMPLE A

A 2000-ml roundbottom, 4-necked flask equipped with a paddle stirrer, nitrogen inlet and thermometer was charged with 99.9 pbw of p,p'-oxybisaniline, 23.1 pbw metaphenylenediamine and 604 pbw NMP. After solution had occurred under a nitrogen purge at room temperature, 72° F., 142.5 pbw of 4-TMAC having a purity of 99.5 percent as determined from chloride content and 6.8 pbw of TMA were added over 2.5 hours while maintaining the temperature between about 77° to about 95° F. When addition was complete, the solution was stirred for 3 hours during which time the solution viscosity increased to a Gardner-Holdt viscosity of Z5, or about 110 poises. Solid polymer was obtained by first pouring the viscous solution into twice its volume of deionized water in a Waring blender and then filtering. The filtrate was washed with five increments of 3000 pbw each of deionized water to remove hydrogen chloride that was generated during the reaction. The solid was dried under a vacuum of 20 inches of mercury for 24 hours at 122° F. The above material was heated for 2 hours in an oven set at 450° F. to obtain the final product. The results of this Experiment are set forth in Table 7.

COMPARATIVE EXAMPLE B

Tensile and flexural test bars molded from the polymer prepared in comparative Example A were annealed at 340° F. for 24 hours, at 470° F. for 24 hours and at 500° F. for 60 hours. The physical properties of these annealed test bars are given in Table 7.

EXAMPLE 30

A 50-gallon reactor equipped with an agitator, nitrogen inlet, and thermocouple was flushed with nitrogen and then charged with 110.0 pounds of NMP, 24.6 pounds of BAPS, and 7.6 pounds of oxybisaniline (OBA). The solution was mixed for 30 minutes and cooled to 60° F. After all the BAPS and OBA was in solution, 20.0 lbs. of 4-TMAC in flake form were added to the mixture over a timer period of 1.5 hours with the mixture temperature maintained below 77° F. To the mixture was added 12 lbs. of NMP. The mixture was heated to 122° F. and maintained at that temperature for two hours. The reactor was then cooled to 77° F. and the polymer was precipitated in deionized water. The precipitated polymer was milled and washed again with deionized water. Following the final wash, the wet cake was centrifuged to remove excess water. The polymer was then heated at 300° F. for 3 hours followed by heat treating at 450° F. The physical properties for the polyamide-imide prepared in this experiment are with 60 mole percent BAPS and 40 mole percent OBA given in Table 7.

EXAMPLE 31

Tensile and flexural test bars molded from the polymer prepared in Example 30 were annealed at 340° F. for 24 hours, at 380° F. for 24 hours and at 425° F. for 60 hours. The physical properties of these annealed test bars are given in Table 7.

EXAMPLE 32

A 50-gallon reactor equipped with an agitator, nitrogen inlet, and thermocouple was flushed with nitrogen and then charged with 118.0 pounds of NMP, 31.6 pounds of BAPS, and 3.8 pounds of oxybisaniline (OBA). The solution was mixed for 30 minutes and cooled to 60° F. After all the BAPS and OBA was in solution, 20.0 lbs. of 4-TMAC in flake form were added to the mixture over a time period of 1.5 hours with the mixture temperature maintained below 77° F. To the mixture was added 120.4 grams of aniline and 13 lbs. of NMP. The mixture was heated to 122° F. and maintained at that temperature for two hours. The reactor was then cooled to 77° F. and the polymer was precipitated in deionized water. The precipitated polymer was milled and washed again with deionized water. Following the final wash, the wet cake was centrifuged to remove excess water. The polymer was then heated at 300° F. for 3 hours. The physical properties for the polyamide-imide prepared in this experiment with 80 mole percent BAPS and 20% mole percent OBA are given in Table 7.

EXAMPLE 33

Tensile and flexural test bars molded from the polymer prepared in Example 32 were annealed at 340° F. for 24 hours, at 380° F. for 24 hours and at 425° F. for 60 hours. The physical properties of these annealed test bars are given in Table 7.

TABLE 7

Mixed Diamine BAPS-based Polyamide-imides

| Example | 17 | 29 | A | B |
|---|---|---|---|---|
| IV, dl/g | 0.57 | 0.58 | 0.62 | N/S |
| Tensile Properties | | | | |
| Yield Strength, $10^3$ psi | 16.4 | 16.5 | N/Y | N/Y |
| Ultimate Str., $10^3$ psi | 14.9 | 14.7 | 11.7 | 27.9 |
| Yield Elongation, % | 11.8 | 11.6 | N/Y | N/Y |
| Ultimate Elongation, % | 21.3 | 16.7 | 5.0 | 14.0 |
| Flexural Properties | | | | |
| Strength, $10^3$ psi | 22.4 | 23.6 | 17.0 | 34.9 |
| Modulus, $10^6$ psi | 0.50 | 0.52 | 0.84 | 0.73 |
| Izod Impact | | | | |
| Notched, ft-lb/in | 3.8 | 3.2 | 0.50 | 2.7 |
| No-Notched, ft-lb/in | 35.1 | 40.0 | 2.3 | 15.0 |
| Thermal Properties | | | | |
| HDT, °F. | 461 | 491 | 470 | 530 |
| Tg, °C. | 259 | 261 | 260 | 282 |
| Example | 30 | 31 | 32 | 33 |
| IV, dl/g | 0.75 | 0.88 | 0.59 | 0.59 |
| Tensile Properties | | | | |
| Yield Strength, $10^3$ psi | N/Y | N/Y | N/Y | N/Y |
| Ultimate Str., $10^3$ psi | 16.0 | 17.3 | 13.7 | 10.9 |
| Yield Elongation, % | N/Y | N/Y | N/Y | N/Y |
| Ultimate Elongation, % | 8.0 | 8.0 | 6.9 | 4.9 |
| Flexural Properties | | | | |
| Strength, $10^3$ psi | 21.4 | NM | 22.6 | 23.7 |
| Modulus, $10^6$ psi | 0.59 | NM | 0.54 | 0.53 |
| Izod Impact | | | | |
| Notched, ft-lb/in | 1.5 | 1.3 | 3.6 | 3.6 |
| No-Notched, ft-lb/in | 9.4 | 9.4 | 26.7 | 10.0 |
| Thermal Properties | | | | |
| HDT, °F. | 469 | 494 | 465 | 491 |
| Tg, °C. | 260 | 267 | 258 | 263 |

N/S - not soluble
N/Y - no yield
NM - not measured

The BAPS/TMA-3% aniline polyamide-imide was subjected to long term thermal aging at 400° F. The results are given in Table 8 below and indicate that optional properties are obtained as-molded without an annealing step required.

TABLE 8

Annealing Studies of BAPS/TMA-3% Aniline Polyamide-imide

| | Hours | | | |
|---|---|---|---|---|
| | 0 | 250 | 500 | 1000 |
| IV, dl/g | 0.57 | 0.57 | 0.60 | 0.62 |
| Tensile Properties | | | | |
| Yield Strength, $10^3$ psi | 16.4 | 17.0 | 17.0 | 17.1 |
| Ultimate Str., $10^3$ psi | 14.9 | 15.0 | 14.8 | 14.9 |
| Yield Elongation, % | 11.8 | 15.0 | 14.8 | 14.9 |
| Ultimate Elongation, % | 21.3 | 22.4 | 17.1 | 18.0 |
| Flexural Properties | | | | |
| Strength, $10^3$ psi | 22.4 | 23.0 | 23.2 | 24.1 |
| Modulus, $10^3$ psi | 0.50 | 0.51 | 0.50 | 0.51 |
| Izod Impact | | | | |
| Notched, ft-lb/in | 3.8 | 3.4 | 3.1 | 2.7 |
| No-Notched, ft-lb/in | | | | |
| Thermal Properties | | | | |
| HDT, °F. | 461 | 478 | 488 | 486 |
| Tg, °C. | 259 | 262 | 264 | 265 |

We claim:
1. An injection moldable polyamide-imide polymer end-capped with about 1 to about 5 percent aniline moieties and comprising recurring amide-imide moieties of:

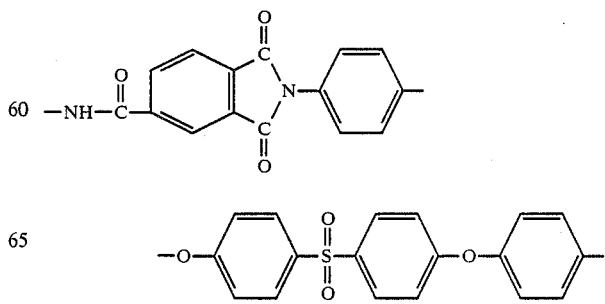

2. The polyamide-imide polymer of claim 1 in combination with about 1 to about 5 percent of an amorphous polyamide.

3. The polyamide-imide polymer of claim 2 wherein said amorphous polyamide has the following recurring structure.

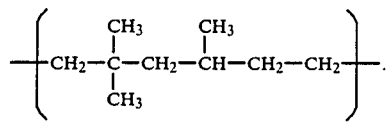

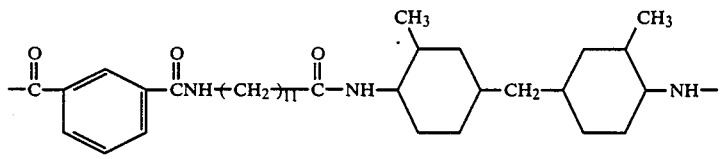

4. An injection moldable polyamide-imide polymer end-capped with about 1 to about 5 percent aniline moieties and comprising recurring units of:

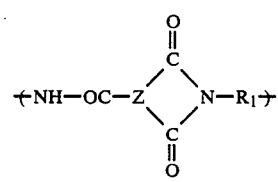

and units of:

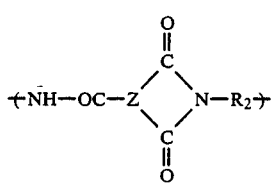

and units of:

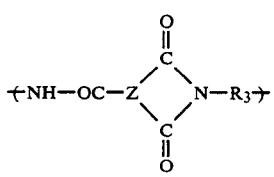

wherein one carbonyl group is meta to and one carbonyl group is para to each amide group and wherein Z is a trivalent benzene ring or a lower-alkyl-substituted trivalent benzene ring, $R_1$ and $R_2$ are the same or different and are selected from the group consisting of

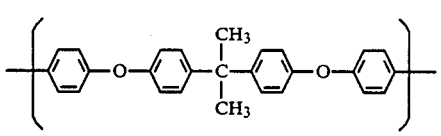

and

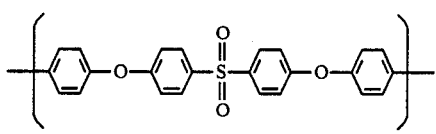

and $R_3$ is the same as $R_1$ or $R_2$ or has the structure

5. The polyamide-imide polymer of claim 4 wherein $R_1$ and $R_2$ have the following structure:

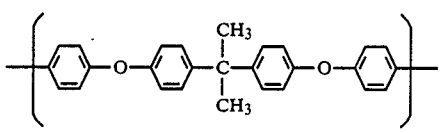

and $R_3$ has the structure:

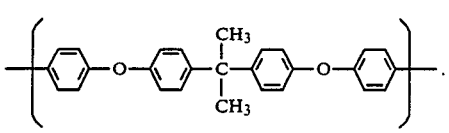

wherein the mole ratio of $R_3$ to both $R_1$ and $R_2$ is about 5:95 to about 30:70.

6. The polyamide-imide polymer of claim 4 wherein $R_1$, $R_2$ and $R_3$ have the following structure:

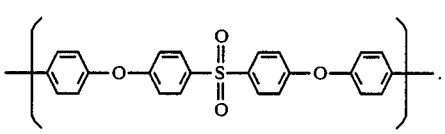

7. The polyamide-imide polymer of claim 4 wherein $R_1$, $R_2$ and $R_3$ have the following structure:

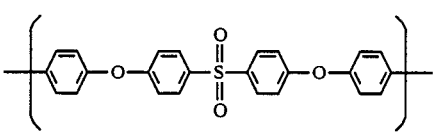

8. The polyamide-imide polymer of claim 4 wherein $R_1$ and $R_2$ have the following structure:

and $R_3$ is a divalent aliphatic hydrocarbon wherein the mole ratio of $R_3$ to both $R_1$ and $R_2$ is about 5:95 to about 30:70.

9. The polyamide-imide polymer of claim 5 wherein the mole ratio of $R_3$ to both $R_1$ and $R_2$ is about 10:90 to about 20:80.

10. The polyamide-imide polymer of claim 8 wherein $R_3$ has the following structure:

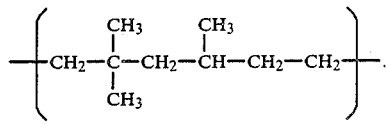

11. An injection moldable polyamide-imide polymer end-capped with about 1 to about 5 percent aniline moieties and comprising recurring amide-imide units of:

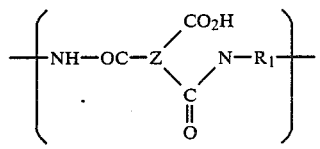

and units of:

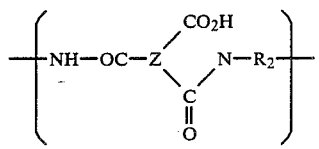

and units of:

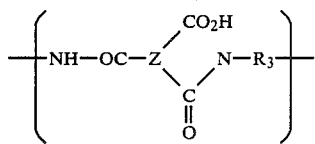

wherein one carbonyl group is meta to and one carbonyl group is para to each amide group and wherein Z is a trivalent benzene ring or lower-alkyl-substituted trivalent benzene ring, $R_1$ and $R_2$ are the same or different and are selected from the group consisting of

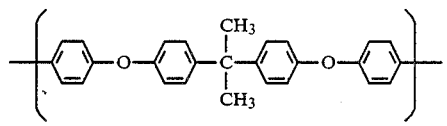

and

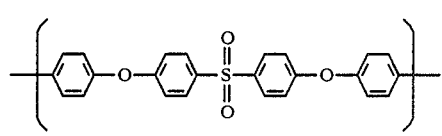

and $R_3$ is the same as $R_1$ or $R_2$ or has the structure

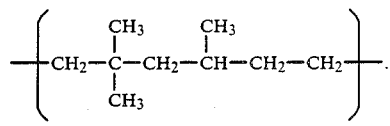

12. The polyamide-imide polymer of claim 11 wherein $R_1$, $R_2$ and $R_3$ have the following structure:

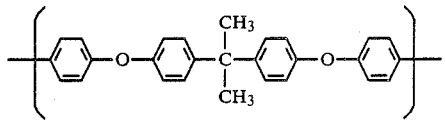

13. The polyamide-imide polymer of claim 11 wherein $R_1$ and $R_2$ have the following structure:

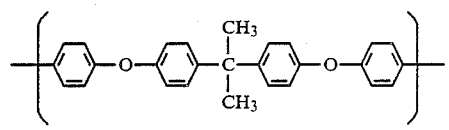

and $R_3$ has the following structure:

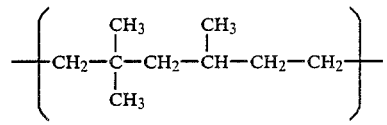

wherein the mole ratio of $R_3$ to both $R_1$ and $R_2$ is about 5:95 to about 30:70.

14. The polyamide-imide polymer of claim 11 wherein $R_1$ and $R_2$ have the following structure:

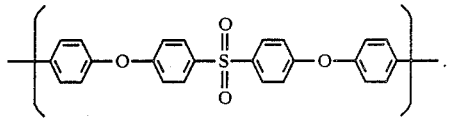

and $R_3$ is

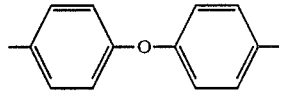

wherein the mole ratio of $R_3$ to both $R_1$ and $R_2$ is about 20:80 to about 40:60.

15. The polyamide-imide polymer of claim 11 wherein $R_1$, $R_2$ and $R_3$ have the following structure:

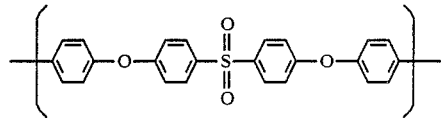

16. The polyamide-imide polymer of claim 11 wherein $R_1$ and $R_2$ have the following structure:

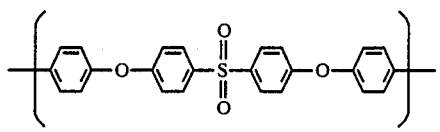
and $R_3$ is a divalent aliphatic hydrocarbon wherein the mole ratio of $R_3$ to both $R_1$ and $R_2$ is about 5:95 to about 30:70.
17. The polyamide-imide polymer of claim 13 wherein the mole ratio of $R_3$ to both $R_1$ and $R_2$ is about 10:90 to about 20:80.
18. The polyamide-imide polymer of claim 16 wherein $R_3$ has the following structure:
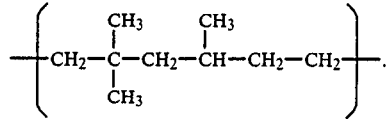
* * * * *

UNITED STATES PATENT OFFICE
CERTIFICATE OF CORRECTION

Patent No. 4,755,585          Dated  July 5, 1988

Inventor(s) ROBERT B. HANSON, JEFFREY D. FELBERG, and GARY T. BROOKS

It is certified that error appears in the above-identified patent and that said Letters Patent are hereby corrected as shown below:

| Column | Line | |
|---|---|---|
| 2 | 10 | "thee" should read --these-- |
| 6 | 9 | "aninile" should read --aniline-- |
| 7 | 66 | "Battenfield" should read --Battenfeld-- |
| 12 | 11 | "at 13" should read --of 13-- |
| 12 | 33 | "and reached" should read --had reached-- |
| 14 | 12 | "has occurred" should read --had occurred-- |
| 17 | 24 | "the melted" should read --then melted-- |
| 19 | 3 | "timer" should read --time-- |
| 19 | 45 | "20%" should read --20-- |

Signed and Sealed this

Thirteenth Day of December, 1988

Attest:

DONALD J. QUIGG

Attesting Officer     Commissioner of Patents and Trademarks